Figure 3:
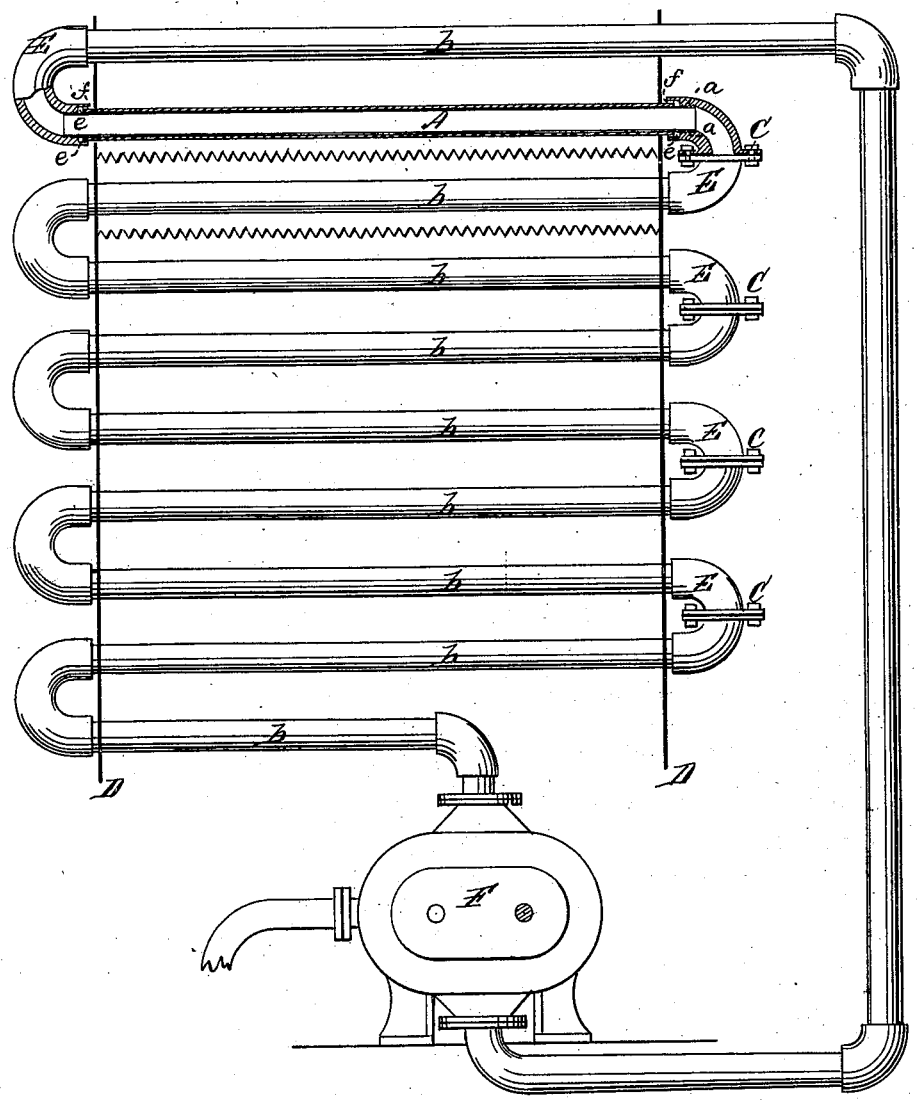

(No Model.)  2 Sheets—Sheet 1.
J. C. De La VERGNE.
Beer Coolers.
No. 230,694. Patented Aug. 3, 1880.
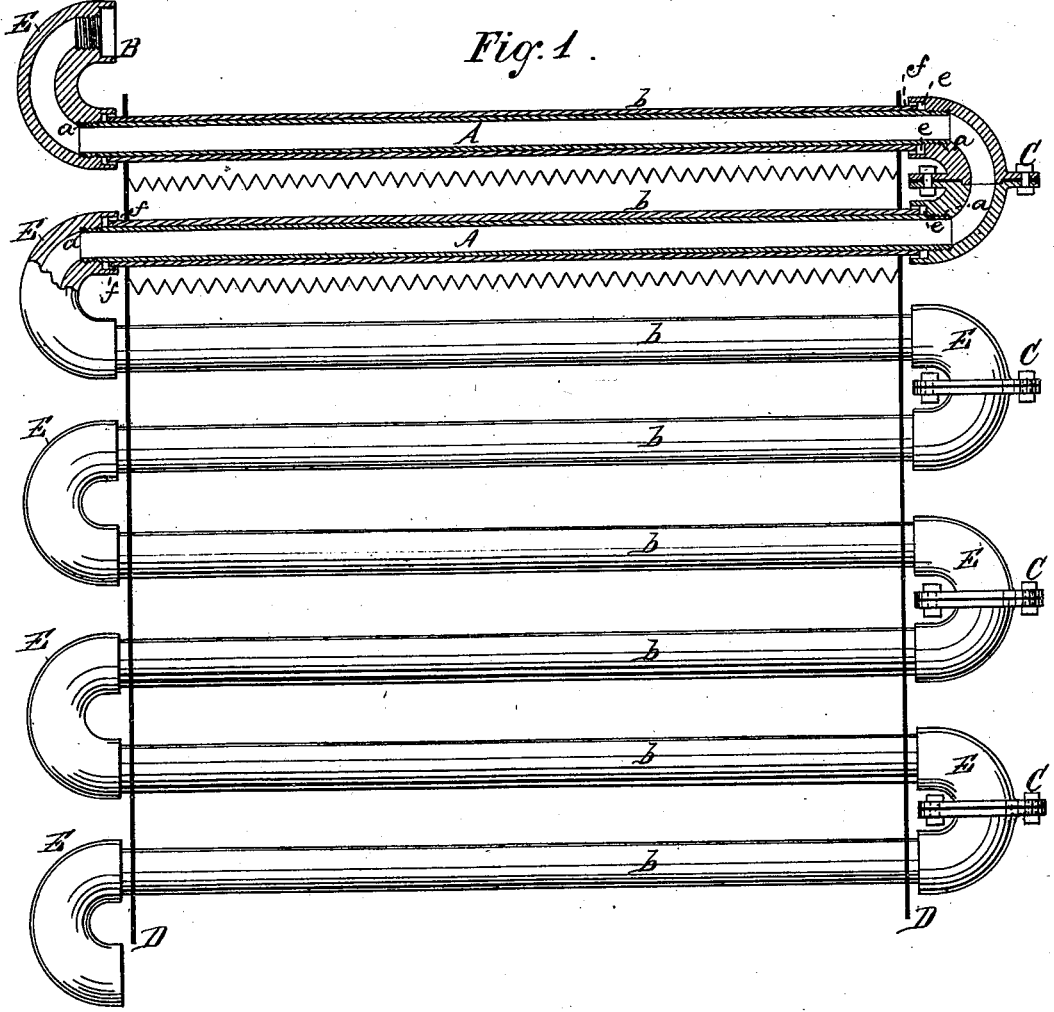
WITNESSES:
Julius J. Suckert
Henry E. Burr
INVENTOR:
John C. De La Vergne
BY
Josiah H. Macy.
ATTORNEY.

(No Model.) 2 Sheets—Sheet 2.

J. C. De La VERGNE.
Beer Coolers.

No. 230,694. Patented Aug. 3, 1880.

WITNESSES:

INVENTOR:

UNITED STATES PATENT OFFICE.

JOHN C. DE LA VERGNE, OF NEW YORK, N. Y.

BEER-COOLER.

SPECIFICATION forming part of Letters Patent No. 230,694, dated August 3, 1880.

Application filed May 11, 1880. (No model.)

*To all whom it may concern:*

Be it known that I, JOHN C. DE LA VERGNE, a citizen of the United States, residing in the city, county, and State of New York, have invented a new and useful Improvement in Beer-Coolers, of which the following is a specification.

My invention relates to an improvement in the class of beer-coolers known as the "Bandelot" cooler; and the objects of my improvements are, first, to substitute ammoniacal or other gases used for refrigeration in place of cold water now used as the circulating medium for cooling beer; and, secondly, to construct an apparatus whereby I may accomplish the same without endangering it to a liability of rapid oxidation and destruction in consequence of the action of the gas or gases upon the metal with which it may come in contact; thirdly, while using iron for the passage-way of ammoniacal or other gases, and to increase the strength of said machine, to prevent the beer from being colored or impregnated by any deleterious compound by falling upon iron or other metal likely to produce such an effect; fourthly, to connect the various parts in such a manner as to avoid the possibility of an escape of gas should pressure be applied to the pipes, and to be able to separate readily sections of them for repairs. I attain these objects by the mechanism illustrated in the accompanying drawings, wherein—

Figure 1, Sheet 1, is a sectional and vertical view of the cooler. Fig. 2, Sheet 1, is a sectional view of the two concentric pipes, showing comparative length of each and the parts which are soldered to the elbows. Fig. 3, Sheet 2, represents a vertical section of the cooler and the pump connected therewith, which forces the ammoniacal or other gas through the iron pipes as a circulating medium for cooling.

Similar letters refer to similar parts.

The invention consists in securing within a frame, D D, a number of iron pipes, A A A, &c., which are placed one above the other, having a thread or screw, $a\ a\ a$, at each end, whereby they are firmly fastened to the return-bends or elbows E. The ends of the pipe next to the screw are admitted within the recessed collar B, and for half of the length within said collar are firmly soldered thereto, as at $e$, Fig. 1, Sheet 1, and Fig. 2, Sheet 1, which prevents the gas from escaping through the threads of the screw $a\ a$ and passing under the pipes $b\ b$, which cover the pipes A, but are not fastened to them except by the elbows.

The pipes $b$ are made of tin, copper, or other metal which can be brazed or soldered, and which will not injure or color the beer passing over it. They are made shorter than the pipes A, but long enough to enter the recessed collar B of elbows E E, as at $f$, Figs. 1 and 2, and be brazed thereto and make an absolutely tight joint, thus establishing a circuit of iron, as at $c$, for the passage of ammoniacal or other gas, which prevents the oxidation or eating away of the metal of which the pipes $b$ are made, and at the same time preventing the beer from coming in contact with any iron surface, which would seriously discolor it by the formation of lactate of iron.

At one end of the pipes the elbows are double, and have a screw-thread, shoulder, and collar, as at B, Fig. 1. At the other end they have the same, but are divided, as at C, Fig. 1, and connected by tongued and recessed flanges with soft-metal washers interposed, being bolted together, as at C, that sections may be readily removed for repairs.

At F, Fig. 3, Sheet 2, the pump is shown for forcing the gas through the pipes A A and $b\ b$. The rapid expansion and circulation of gas through the pipes A quickly reduces their temperature, when they impart a good share of their cold to the pipes $b$, with which they are in close contact, and over which the beer passes and is soon cooled.

I am aware that copper tubes were used for cooling beer prior to my invention, and that joints have been made by screwing single pieces or pipes into elbows and soldering them. I make no claim to these broadly; but, Having described my invention, what I claim as new, and desire to secure by Letters Patent of the United States, is—

1. In a beer-cooler, a series of copper-covered iron pipes, A A, placed horizontally and in a vertical line, in combination with return-bends E E E, which have in the inner passage thereof, at one end, a screw-thread, $a$, and a recessed projecting collar, B, to which the said pipes are fastened by being screwed and soldered therein, substantially as described.

2. In a beer-cooler, a series of copper-covered iron pipes placed horizontally and in a vertical line, in combination with return-bends which have in the inner passage thereof and at one end a screw-thread, and a recessed projecting collar for the admission and fastening of said pipes by being screwed and soldered therein, and a flanged, tongued, and recessed union, C, with a washer interposed, also in combination therewith, substantially as described.

In testimony whereof I have hereto set my hand and seal in the presence of two subscribing witnesses.

JOHN C. DE LA VERGNE. [L. S.]

Witnesses:
WALTER W. MONTAGUE,
JOSIAH H. MACY.